United States Patent [19]
Silverman

[11] 3,840,090
[45] Oct. 8, 1974

[54] CONTROL MEANS FOR PRESSURE FLUID VIBRATORS FOR GENERATING SEISMIC WAVES IN THE EARTH

[76] Inventor: Daniel Silverman, 5969 S. Birmingham St., Tulsa, Okla. 74105

[22] Filed: Oct. 11, 1972

[21] Appl. No.: 296,669

Related U.S. Application Data

[63] Continuation-in-part of Ser. Nos. 223,896, Feb. 7, 1972, and Ser. No. 296,670, Oct. 11, 1972.

[52] U.S. Cl. .............................................. 181/119
[51] Int. Cl............................................. G01v 1/14
[58] Field of Search....... 181/.5 H, .5 NC; 340/15.5; 137/38; 251/14, 16, 17

[56] References Cited
UNITED STATES PATENTS

| | | | |
|---|---|---|---|
| 2,955,460 | 10/1960 | Stevens | 181/.5 H |
| 3,208,550 | 9/1965 | Castanst | 181/.5 H |
| 3,216,525 | 11/1965 | Fail | 181/.5 H |
| 3,363,720 | 1/1968 | Mifsud | 181/.5 H |
| 3,578,102 | 5/1971 | Ross | 181/.5 H |

Primary Examiner—Benjamin A. Borchelt
Assistant Examiner—J. V. Doramus

[57] ABSTRACT

This invention describes improvements in electro-fluid vibrators used for generating seismic waves in the earth in which the flow of pressurized fluid to the vibrator is controlled in accordance control the resultant holddown pressure on the baseplate in contact with the earth, so that there is always a positive pressure on the baseplate, preventing it from being lifted off the surface of the earth.

Force measuring means are provided in the holddown means. So long as this force is large and positive (in the direction to hold the baseplate to the earth) no cntrol is required. When this positive force becomes less than a preselected value the pressure fluid system is controlled to reduce the pressure and/or the volume rate of flow of the pressurized fluid to reduce the force output of the vibrator. The force measuring system can conveniently utilize the compliances in the holddown system as the force measuring elements.

15 Claims, 10 Drawing Figures

CONTROL MEANS FOR PRESSURE FLUID VIBRATORS FOR GENERATING SEISMIC WAVES IN THE EARTH

CROSS-REFERENCES TO RELATED APPLICATIONS

This application is a continuation in part of my copending application Ser. No. 223,896, filed Feb. 7, 1972, entitled: Vibrator System for Generating Seismic Waves in the Earth, now U.S. Pat. No. 3,789,951 and Ser. No. 296,670, filed Oct. 11, 1972 entitled: Improvements in Vibrator Systems for Generating Elastic Waves in the Earth, both of which applications are made part of this application by reference.

BACKGROUND OF THE INVENTION

This invention is in the general field of large-force, reaction type, electro-fluid vibrators. More particularly, it is related to vibrators for generating elastic waves in the earth for geophysical purposes. Still more particularly it is concerned with control means to ensure that the vibrator will not provide an alternating force on the earth which is greater than the direct holddown force on the vibrator base plate in contact with the earth.

In the geophysical industry there are in use large truck-mounted electrohydraulic reaction type vibrators. These comprise piston-cylinder systems connected between a baseplate resting on the earth and a large reaction mass. Generally the truck itself is used to provide a downwardly directed constant force applied to the base plate to hold it in contact with the earth. This force is generally applied to the baseplate through a plurality of compliances, which serve to transmit the direct force, while isolating the truck mass from the vibrating baseplate.

If the alternating force generated between the reaction mass (which will be considered to be substantially fixed in space) and the baseplate, is greater than the direct positive force applied by the truck through the compliances to the base plate, then the baseplate will have intermittent negative forces tending to lift it out of contact with the earth.

This loss of contact is disastrous for two reasons. First, and foremost it produces a high level of noise and harmonics in the generated seismic waves. Second, it may cause great damage to the vibrator and truck. For these reasons a control means is required to ensure that there will never be a negative resultant (upwardly directed) force on the baseplate while it is operating.

SUMMARY OF THE INVENTION

It is a principal object of this invention to provide a control means on the electro-fluid vibrator system to prevent a negative force on the baseplate.

It is a further object of this invention to provide a means to measure the instantaneous holddown force on the baseplate and provide a servo control system responsive to this force, to so control the pressure fluid to prevent a negative force on the baseplate at all times that the vibrator is operating.

It is a still further object to provide a peak force measuring system to control the servo system.

These and other objects are realized and the limitations of the prior art are overcome in this invention by the use of a force measuring means in the holddown system. This will register a large direct positive force plus an alternating force corresponding to the alternating force generated by the vibrator. So long as the direct force is larger than the alternating force no control is necessary. However, when the momentary positive force becomes less than a selected minimum, the servo system acts either to reduce the pressure in the high pressure accumulator, or to reduce the volume of fluid injected into the vibrator, so as to reduce the force output of the vibrator.

The holddown force can be applied to the baseplate from the truck frame through columns which are attached to compliances which are attached to the baseplate. Extensometers of the resistive or inductive types can be attached to the columns to measure the instantaneous force transmitted by the columns. The outputs of the extensometers go to a servo system to control the fluid.

Conversely the instantaneous length of the compliances can be used as measures of the forces. These lengths can be conveniently measured by inductive sensors, etc. Or, since the change in length of the compliances is quite large, a control valve of the cylinder type can be connected across each of one or more compliances to directly control the fluid to, or bypass fluid around the vibrator.

BRIEF DESCRIPTION OF THE DRAWINGS

These and other objects of this invention and a better understanding of the principals and details of the invention will be evident from the following description taken in conjunction with the appended drawings, in which.

DESCRIPTION OF THE PREFERRED EMBODIMENTS

Figure 1:
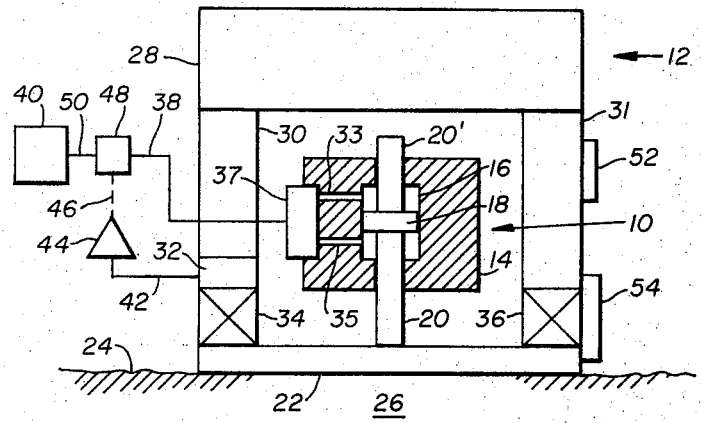
FIG. 1 represents a generalized view of a vibrator system controlled by force sensors.

Referring to the drawings, there is shown in FIG. 1 a conventional vibrator 10 comprising a mass 14 with cylinder 16, piston 18 and piston rods 20, 20'. The piston rods are rigidly fastened to the baseplate 22 which rests on the surface 24 of the earth 26. A large weighting means 12, which can conveniently be a truck frame, etc., 28, has downwardly depending rods 30, 31, which are fastened to compliances 34, 36, respectively, which are fastened to the baseplate 22. The weight 28 presses the baseplate 22 against the earth with a positive (downwardly acting) force W, the weight of the frame 28.

The vibrator 10 has a servo valve 37 which, under electrical signal, injects high pressure fluid into the cylinder 16 alternately above and below the piston 18, through conduits 33, 35, so as to drive the baseplate in alternating vertical directions. Since the mass 14 is very large, under the alternating force of the vibrator, the mass remains essentially stationary, while the baseplate oscillates with an appreciable amplitude, as is well known in the art. Although the weight 28 is supported on the vibrating baseplate, it is isolated by the compliances 34, 36, so that the weight 28 remains essentially at rest.

Figure 3:
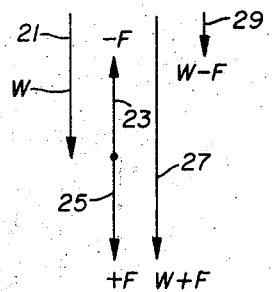
FIG. 3 is a force diagram of FIG. 2.

Referring for a moment to FIG. 3 there is shown a downwardly directed arrow 21 (or vector) representing a downward, constant force W, due to the weight 28. There are two vertical arrows 23, 25, their bases placed at the tip of 21. These arrows (vectors) represent the alternating force on the baseplate by the vibrator. Vector 23 is a force −F and vector 25 is a force +F. Thus the total force exerted on the earth is represented by the arrows 27, 29, being a maximum downward force of W + F and a minimum downward force of W − F.

So long as W is greater than F, there is always a downward force on the earth. However, if F momentarily becomes greater than W, then the force W − F becomes negative and the baseplate will lift off the earth. This causes noise to be generated in the seismic waves, and may do great harm to apparatus, both of which must be avoided if at all possible. This invention is concerned with apparatus to measure the force W±F and when F approaches W in magnitude, to control the vibrator so that F will never be greater than W.

In FIG. 1 it is shown that the force W±F can be measured by force measuring means applied to the rods 30, 31. For example 52 represents an extensometer of the resistive or inductive types, which are well known in the art and which measure the contraction and extension of the rods 30, 31, which is a measure of the force applied by the baseplate 22 through the compliances 34, 36, through the rods 30, 31 to the stationary weight 28.

The force can also be measured by a load cell 32, inserted in series with the rod 30, for example. The load cells are generally a compliance with a dimension sensor, which, like the cell 52, can be resistive, capacitive, or inductive.

The electrical output voltage can be an AC or a DC voltage, which is a function of the force. This can go from load cell 32, for example, via leads 42 to servo amplifier 44 to control, through means 46, to a second valve 48, which monitors the rate of flow of pressurized fluid from a high pressure accumulator 40, through line 50 through control valve 48 and through line 38 to the servo valve 36 on the vibrator. Therefore, as the force F of the vibrator increases, W+F increases, and controls valve 48 to restrict the flow of fluid. The output of the load cell 32 can also be used to directly control servo valve 37 to reduce the amplitude of vibration.

The force in the rod 31 can also be measured by measuring the extension or compression of the compliance 36 by extensometer means 54 connected between the rod 31 and the baseplate 22.

Figure 2:
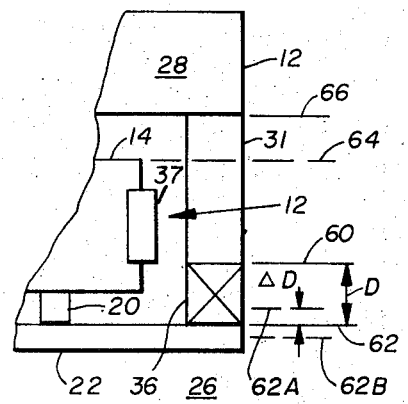
FIG. 2 is a view of a portion of FIG. 1.

Referring to FIG. 2, there is shown a portion of the right side of FIG. 1, including the weight 28, rod 31, compliance 36 and baseplate 22. The mass 14 of the vibrator 12 and piston rod 20 are also shown. For purpose of analysis, it will be assumed that both the mass 14 and the weight 28 remain fixed in space, as shown by lines 64, 66, respectively. The dimension D of the compliance will vary, from D to D±ΔD as shown by lines 62, 62A, 62B. Also it is assumed that only on a single compliance is used and the full weight W is pressing on the single compliance.

Figure 4:
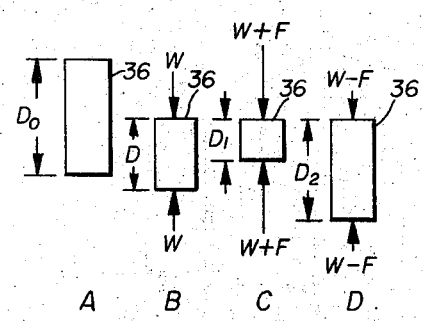
FIG. 4 represents the compaction of the compliance under the various forces acting on the baseplate.

Refer now to FIG. 4 where the compliance 36 is shown in 4 different conditions. In (A) it is shown of length $D_o$, unstressed, with no forces acting along its axis. In case (B), the weight 28 presses down on the compliance with a force W, and the baseplate presses up with an equal force W. The dimensional difference $D_o - D$ represents the compaction of the compliance under the force W.

Now consider that the baseplate oscillates with an amplitude ±ΔD, which is the result of the force ±F exerted by the vibrator, and the stiffness of the earth. When the baseplate moves up it exerts a force W + F on the compliance compressing it to a dimension $D_1$ (case C) and when it moves down, the force exerted is W − F (Case D) and the compliance extends to length $D_2$. The amplitude of vibration ΔD and the variation in dimension of the compliance are very greatly enlarged, for purposes of illustration. When $F = W$, the length $D_2$ would be equal to $D_o$. Thus, by measuring the lengths D±ΔD, that is, $D_1$ and $D_2$, the force exerted on the compliance can be measured, which is a measure of the resultant force of the baseplate on the earth.

The danger point is approached when F approaches W, or where W − F approaches zero, or when $D_2$ approaches $D_o$.

Figure 5:
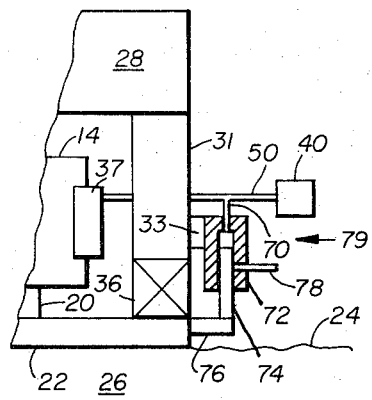
FIGS. 5, 6, 7, 8, illustrate the use of fluid valves responsive to the instantaneous dimension of the compliance to control the vibrator.

In FIG. 5 is shown a simple valve 79 which comprises a cylinder 72 attached to rod 31 through base 33. A piston 74 is sealed into the cylinder 72, and is attached to the baseplate 22 through arm 76. High pressure fluid from accumulator 40 flows through conduit 50 to servo valve 37, a branch conduit 70 goes to the cylinder 72, and an outlet conduit 78 goes to the low pressure accumulator (not shown). As the dimension $D_2$ approaches $D_o$, on the downstroke, the top of the piston 74 uncovers the outlet conduit 78, and permits part of the fluid in conduit 50 to be shunted around the servo valve 37, limiting its force output.

Figure 6:
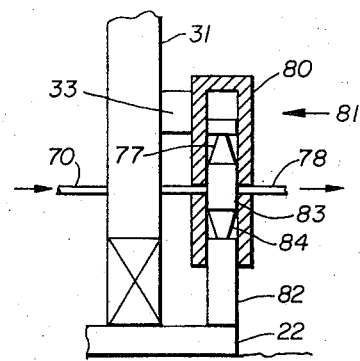

The valve 79 is single acting, and controls only on the extension half of the cycle. In FIG. 6, a valve 81 is shown, patterned on the valve 79, but which by-passes pressure fluid at extremes of both up and down stroke. A cylinder 80 is attached to rod 31. The piston 82 is attached to baseplate 22. The conduits 70 and 78 enter the cylinder on opposite sides. The central portion 83 of the piston is full diameter, and seals the conduit 70. However, on large amplitudes of baseplate motion, the undercut portions 77, 84 of the piston permit fluid to flow from 70 to 78. The larger the amplitude, the larger the flow due to the conical shape.

Figure 7:
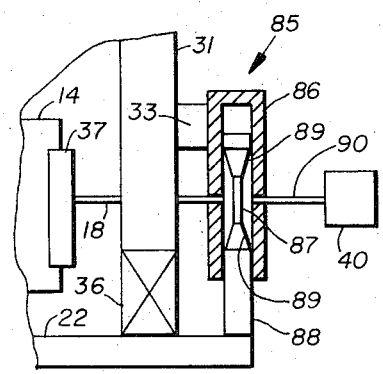

In FIG. 7 is shown a variation of the valve 81 of FIG. 6. Here the valve 85 passes fluid from the accumulator 40 through conduit 90, around the neck 87 of the piston, through conduit 18 to the servo valve 37 on the mass 14 of the vibrator. On large amplitude strokes, the neck widens out 89, and so restricts the flow of fluid to the vibrator. The higher the amplitude the greater the restriction, on both directions of motion.

Figure 8:
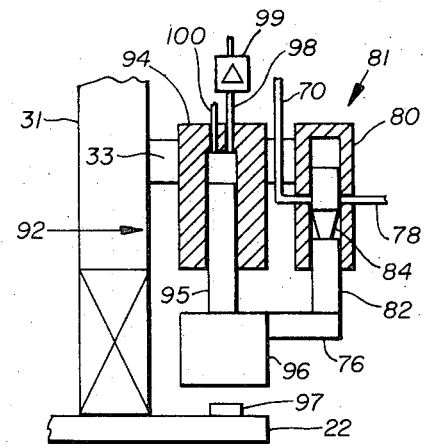

In FIG. 8 is shown a further variation of the control valves 79, 81, 85. This valve 92 includes a mass 96 supporting a piston 95 sealed into a cylinder 94 attached to the rod 31 through base 33. There are two conduits through the top of cylinder. One, 98 carries a check valve which allows fluid to flow out of the cylinder on the upstroke of the piston, but closes on the downstroke of the piston. The other conduit has a small leak, which permits fluid to flow slowly back into the cylinder. Thus the mass can move up rapidly, but can only fall slowly. The baseplate 22 carries a hammer 97 aligned with the mass. On the upstroke of the baseplate, the hammer hits the mass and causes it to move up. By the time the hammer has reached the top of its stroke on the next cycle the mass has only dropped a small distance, and the hammer taps it up again. Thus the position of the mass 96 is a measure of the peak upward amplitude of the base plate. The valve 81 is positioned with its cylinder 80 attached to rod 31 and piston 82 attached to mass 96 through arm 76. Thus the valve effect is a function of the peak amplitude of oscillation of the baseplate.

Figure 9:
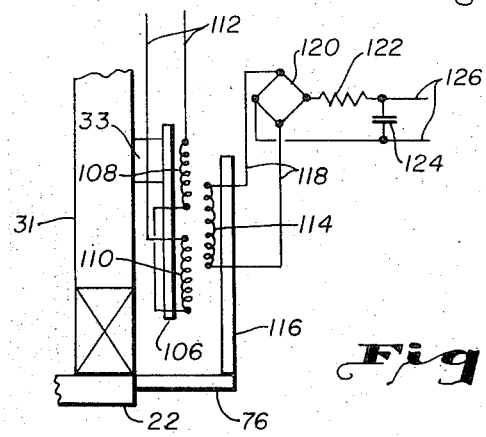
FIG. 9 illustrates the use of an A.C. type extensometer, responsive to the dimension of the compliance to control the vibrator.

While the valve systems shown in FIGS. 5, 6, 7, 8, are simple and foolproof, they cannot easily provide the complex logical control that is possible with electrical circuits. In FIG. 9 the dimensional sensor is shown as an inductive device well known in the art. These generally comprise 2 fixed coils, 108, 110 spaced axially from each other and powered with AC current, by means of leads 112. The magnetic fields set up by the two coils are in opposite directions. The two coils are mounted on arm 106 attached to rod 31. A third moveable coil 114 is attached to arm 116 which is attached to baseplate 22 through arm 76. The third coil is a secondary winding in the fields of the two coils 108, 110 which constitute primary windings of a transformer. When the coil 114 is symmetrically placed with respect to coils 108, 110, the voltage generated in coil 114 due to each of the coils 108, 110 will be equal and of opposite phase. When the coil 114 moves up, it will get more flux from coil 108 and its voltage will go up and will be in a first phase. When the coil moves down, it will get more flux from coil 110, and its voltage will be in opposite phase.

The output of coil 114 goes to a bridge rectifier 120 and through resistor 122 to capacitor 124. The voltage output at leads 126 across capacitor 124 will be a DC voltage whose magnitude will increase with increase in amplitude of the base plate. Thus the voltage at 126 is a measure of the force exerted on the compliance, and therefore a measure of the force F of the vibrator.

The DC voltage output can be used to bias an amplifier, or by other means, well known in the art, control the gain of an amplifier applying a drive signal to the vibrator. Such servo amplifiers driving hydraulic amplifiers to drive vibrators are well known in the art and need not be described in detail. Having derived a voltage which is a measure of the force F output of the vibrator, there are many ways well known in the art to apply this voltage to control the force output of the vibrator.

While the description of apparatus has been based on a simple system with a single compliance, it is well known that commercial vibrators have a plurality of compliances. A preferred embodiment would therefore provide a displacement sensing means on each compliance. The outputs of the plurality of sensors could be averaged to get a single control signal. It is preferred, however, to use the highest voltage signal to control the vibrator. For example, consider a rectangular base plate with a compliance in each corner. When the baseplate is on uniform, level earth, it is likely that all sensors will provide the same signal. In this case, it is immaterial whether a single sensor signal is used, or the average of the four signals. However, if the baseplate rests on a big boulder, for example, so that one corner is not in contact with the earth. In that case all four sensors will undoubtedly not provide the same signal, and the largest signal should be used to control the force output of the vibrator.

Figure 10:
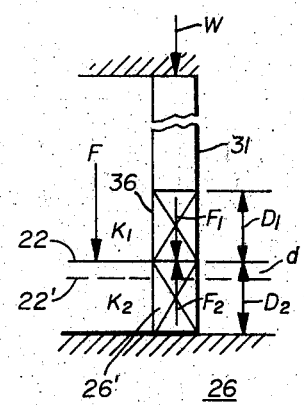
FIG. 10 illustrates the static and dynamic forces acting on the vibrator and the earth.

Referring to FIG. 10, there is illustrated the rod 21 fixed in space. The earth is shown as a stationary part 26 plus a compliant part 26'. The base plate 22 is positioned between the compliances 36 and 26'. The compliance 36 is of unstressed length $D_o$, and with force W applied, it is of length $D_1$. Similarly 26' is unstressed length $D_{o2}$ is of length $D_2$ with force W applied. Consider that under a force F + of the vibrator the baseplate moves down a distance $d$. The compression in 36 is $F_1$, and in 26' is $F_2$.

$F_1 = W - K_1 d$
$F_2 = W + K_2 d$ where $K_1$, $K_2$ are the spring constants of the compliances 36, 26'. Since $F_2 = F_1 + F$
$W + K_2 d = F + W - K_1 d$
$F = (K_1 + K_2)d$.

Thus the amplitude of vibration $d$, is a function of $(K_1 + K_2)$. $K_2$ is a function of the earth. But $K_1$ is at the choice of the user. This invention contemplates the adjustment of the spring constant $K_1$ to control the amplitude of $d$.

While I have described my invention in relation to conventional geophysical vibrators, it will be clear that it can be applied to all vibrator systems which utilize a holddown force, including the improved vibrators described in my two copending applications Ser. Nos. 223,896 and 296,670 which are made part of this application by reference.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In a vibrator system, including vibrator means, comprising two parts reciprocable with respect to each other, mass means connected to one part and baseplate means connected to the other part, high pressure fluid accumulator means, and first valve means and first valve control means to repetitively inject said high pressure fluid into said vibrator means, said vibrator means generating a pulsating force output of magnitude F; and weighting means pressing on said baseplate means through at least one support means and compliance with a steady force W;

the improvement in means to control the magnitude of the peak force output of the vibrator means, so that the peak value of the force output F of said vibrator means will always be less than the force W applied by said weighting means, comprising;

a. force measuring means in said support means responsive to the force applied between said weighting means and said baseplate means, and b. second control means responsive to said force measuring means for controlling said high pressure fluid flowing to said first valve means and into said vibrator means.

2. The improvement as in claim 1 in which said force measuring means comprises said at least one compliance connected between said weighting means and said baseplate means, and dimension measuring means connected between the two ends of said compliance.

3. The improvement as in claim 2 in which said dimension measuring means comprises valve means.

4. The improvement as in claim 3 in which second valve means controls the rate of flow of pressure fluid to said first valve means and said vibrator means.

5. The improvement as in claim 3 in which second valve means controls the pressure of said pressure fluid supplied to said first valve means and said vibrator means.

6. The improvement as in claim 1 in which said force measuring means comprises load cell means in said at least one support means, said second control means responsive to said load cell means.

7. The improvement as in claim 6 in which said second control means controls second valve means on the output of said high pressure fluid accumulator means.

8. The improvement as in claim 7 in which said second valve means controls the maximum rate of flow of said high pressure fluid from said accumulator to said first valve means.

9. The improvement as in claim 7 in which said second valve means controls the maximum pressure of said high pressure fluid flowing from said accumulator to said first valve.

10. The improvement as in claim 1 in which said force measuring means comprises first extensometer means, such as strain gage means, for measuring the compression in said at least one support means, said second control means responsive to said first extensometer means.

11. The improvement as in claim 1 including a plurality of support means and compliances in parallel between said weighting means and said baseplate means, and including a plurality of force measuring means, each in operating relation to one of said support means;
said control means responsive to one of said plurality of force measuring means indicating the largest value of peak force.

12. The improvement as in claim 1 including a plurality of support means and compliances in parallel between said weighting means and said baseplate means, and including a plurality of force measuring means, each in operating relation to one of said support means:
said control means responsive to a function of the outputs of all of said plurality of force measuring means.

13. The improvement as in claim 2 including a plurality of force measuring means comprising a plurality of compliances connected in parallel between said weighting means and said baseplate means, and a plurality of dimension measuring means, one connected between the two ends of each of said plurality of compliances;
said second control means responsive to the dimension measuring means showing the largest variation in dimension.

14. The improvement as in claim 2 including a plurality of force measuring means comprising a plurality of compliances connected in parallel between said weighting means and said baseplate means, and a plurality of dimension measuring means, one connected between the two ends of each of said plurality of compliances;
said second control means responsive to a function of the variations in dimension of said plurality of dimension measuring means.

15. The improvement as in claim 3 in which said second valve means comprises
a. a cylinder and a piston reciprocably sealed therein;
b. one of said cylinder and said piston connected to one end of said compliance, the other of said cylinder and said piston connected to the other end of said compliance, whereby the relative position of said piston and said cylinder is responsive to the instantaneous dimension of said compliance;
c. means to flow said high pressure fluid into and out of said cylinder; and
d. said fluid flow responsive to the relative position of said piston and said cylinder.

* * * * *